United States Patent [19]

Blaxtan et al.

[11] 3,867,570

[45] Feb. 18, 1975

[54] SYSTEM FOR CONVERTING CINEMATOGRAPHIC FILM IMAGES INTO TELEVISION PICTURES

[75] Inventors: Peter William Blaxtan, Welwyn; John David Millward, Hitchin; Richard Thomas Such, Bishops Stortford, all of England

[73] Assignee: Decca Limited, London, England

[22] Filed: Mar. 12, 1973

[21] Appl. No.: 339,971

[30] Foreign Application Priority Data

Mar. 14, 1972 Great Britain .................... 11861/72

[52] U.S. Cl. .......................... 178/7.2, 178/DIG. 28

[51] Int. Cl. .......................... H09n 5/24, H04n 5/88

[58] Field of Search .......... 178/DIG. 28, 7.2, 6.7 A; 235/150.53

[56] References Cited

UNITED STATES PATENTS

| | | | |
|---|---|---|---|
| 3,651,254 | 3/1972 | Metzger | 178/DIG. 28 X |
| 3,707,599 | 12/1972 | Brown | 178/DIG. 28 X |

*Primary Examiner*—Howard W. Britton
*Assistant Examiner*—Aristotelis M. Psitos
*Attorney, Agent, or Firm*—Edward F. Connors

[57] ABSTRACT

A system in which a television camera scans the frames of a film in a cine projector. The film is driven by a geneva which also drives a drum which co-operates with sensing cells to provide selection of time base error correction signals for the camera.

1 Claim, 2 Drawing Figures

SYSTEM FOR CONVERTING CINEMATOGRAPHIC FILM IMAGES INTO TELEVISION PICTURES

Figures 1, 2:
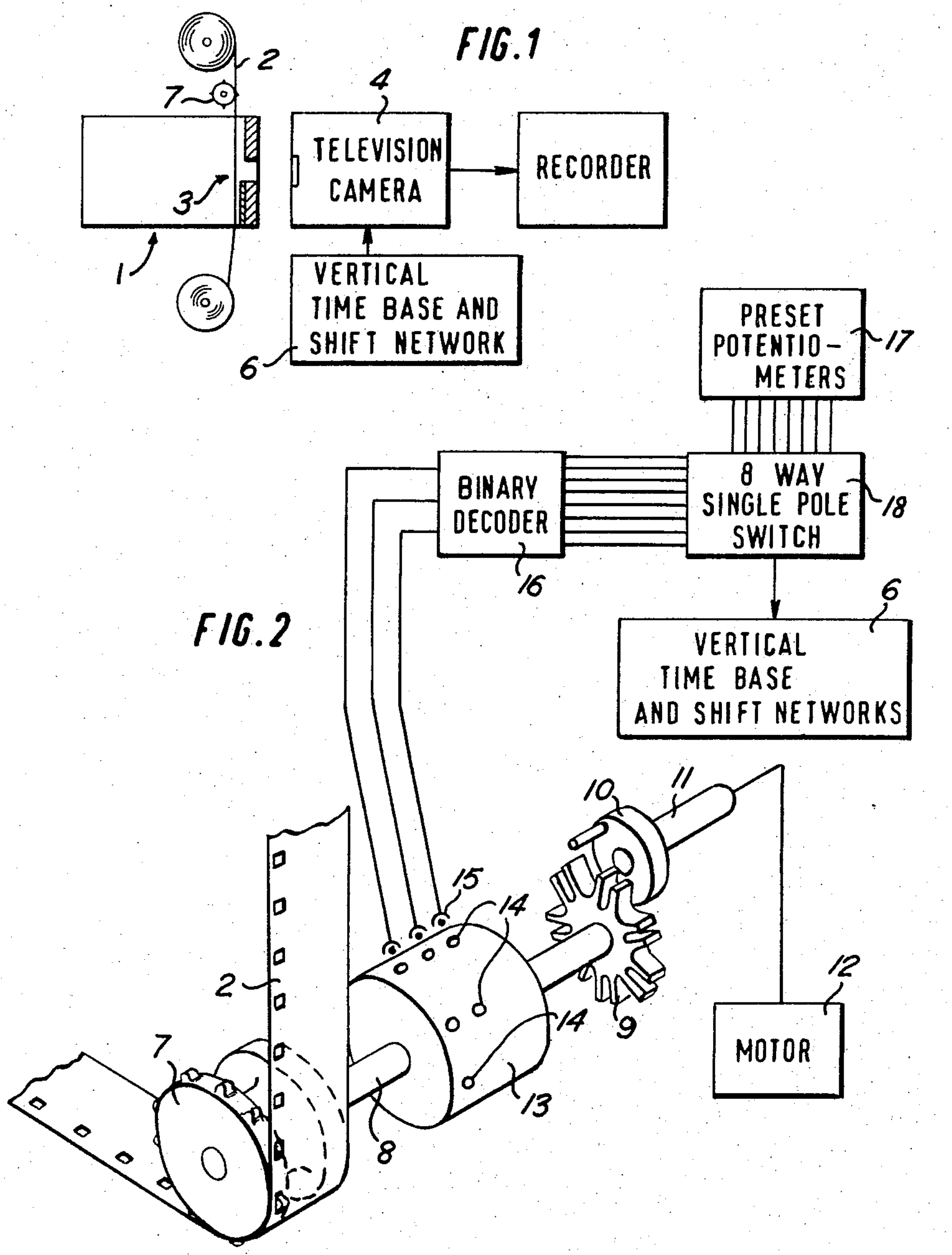

This invention relates to the correction of instability in cinematographic film projectors which are used in conjunction with a television camera for converting cinematographic film images to television picture signals.

It is usual for this purpose to employ a film projector which includes a cyclically and intermittently movable drive member, such as a sprocket, by which the frames of the cinematographic film are moved successively through an optical gate. A raster in the television camera associated with the projector is produced in order to develop, while each frame is stationary, corresponding television picture signals.

Such an apparatus is subject to errors in the positioning of the film. The present invention particularly concerns the reduction of such errors.

The present invention rests on an appreciation that the principal errors in the positioning of a frame occur cyclically and can therefore be regarded as a plurality of constant errors each associated with a particular one of a plurality of discrete positions through which the film's drive member cycles.

The invention subsists in a system for converting cinematographic film images into television picture signals and comprising an optical gate, a cyclically and intermittently movable drive member for moving the frames of a cinematographic film through the optical gate and a television camera arranged to develop, for each of the said frames, a corresponding television signal, the camera including a time base control network for shifting the position of a scanning raster in a pictorially vertical sense, in which system there is provided a correction system comprising means for providing a plurality of corrective signals, each denoting an error in the pictorially vertical positioning of a frame in the gate, and a cyclic selector which operates in accord with the movement of the drive member to cause one corrective signal at a time to be fed to the said time base control network.

The error signals may be obtained from a set of adjustable potentiometers. These potentiometers can be pre-set in accord with the cyclically repeating errors associated with the several positions of the drive member.

Accordingly corrections can be made for errors due to either the film or the mechanism provided that the errors are cyclic and predeterminable.

Reference will hereinafter be made to the accompanying drawings, in which:

FIG. 1 illustrates a known system for converting cinematographic pictures into television signals; and FIG. 2 illustrates apparatus for use in conjunction with the system of FIG. 1 in accordance with the invention.

FIG. 1 illustrates schematically a well known apparatus for converting cinematographic pictures into television signals. A projector 1 is constructed to traverse a cinematographic film 2 so that frames thereof are successively stopped momentarily in a gate 3 so that they can be scanned via an optical system 3*a* in a raster scan by a television camera 4 which may feed television signals to a recorder 5. The camera has 'vertical' time base and shift networks 6 of known construction, by means of which the vertical positioning of the raster scan can be altered on receipt of a suitably proportioned corrective signal. The film 2 is driven by a drive member in the form of a sprocket wheel 7.

FIG. 2 illustrates the principal features of an embodiment of the invention.

Referring to the drawing a cinematographic film 1, sprocket wheel 7 is carried on a shaft 8 which is driven by a geneva star 9 itself driven by a geneva pin-wheel 10 carried on a shaft 11. A motor 12 drives the shaft 11.

In the present embodiment the movement of the star 9 through successive discrete angular positions causes the advance of the film by a frame. The error in the positioning of the frame in the gate 3 may be determined by the position of a tooth, the eccentricity of the shaft 8 and the position of the geneva. The tooth may not be positioned angularly correctly. There may be machining errors or other errors in the geneva star or the associated mechanism so that the frame's actual position does not correspond with what it should be.

Errors due to these causes are constant and cyclic; errors in the mountings (bearing errors) can be made negligible by comparison. There is a cycle of movement in each of which there is a series of positions of the sprocket wheel uniquely associated with a particular eccentricity of the shaft and a particular position of the geneva star. Only one particular tooth will locate the film for a particular position of the sprocket because the distance between the teeth is always greater than the distance between the sprocket holes on the film.

In order that correction can be applied to the raster in the television camera, each position in the cycle of operation of the drive mechanism. consisting of sprocket and geneva, is associated with a respective one of pre-set potentiometers (eight in this example) arranged to provide a corresponding pre-set corrective signal to the time bas control network of the television camera.

In the present embodiment, a drum 13 is provided with coded sets of marks, in this case holes 14, each set corresponding to one of the teeth on the sprocket wheel. In the present case the sprocket wheel has eight teeth and is moved on by one tooth position at a time for each position in the cycle of operation of the mechanism. Accordingly the codes may be the numbers 0 to 7 expressed in binary form. Accordingly sensing means in the form of three photocells 15 can be used in association with the sets of holes and a suitably positioned lamp to provide a signal to a binary decoder 16 which identified the tooth or position of the sprocket and controls in eight-way single pole switch 18 to select the output of a respective one of eight preset potentiometers 17 to deliver the required corrective signal to, in this case, the vertical time base and shift networks 6 of the television camera. The potentiometers would normally be set in accord with errors determined by means of a preliminary trial.

We claim:

1. A system for converting cinematographic film images into television pictures, comprising:
- an optical gate;
- a cyclically and intermittently movable sprocket wheel for moving the frames of a cinematographic film through said optical gate;
- a television camera including means for scanning a frame in said gate in a raster scan and a time base control network for shifting the position of a scanning raster in a pictorially vertical sense;

a plurality of potentioneters for storing a plurality of predetermined corrective signals, each denoting a predetermined error in the pictorially vertical positioning of a frame in the gate;

a cyclic selector means comprising a member having coded sets of indications, each indication corresponding to a tooth on the sprocket wheel; and means for reading out said signals one at a time and feeding said signals comprising a decoder, a sensing means coupled to the decoder for detecting the indications and switch means, controlled by the decoder, for selecting the output of one of said plurality of potentiometers and for feeding the selected output to the time base network.

* * * * *